United States Patent [19]

Belongia et al.

[11] Patent Number: 5,568,764

[45] Date of Patent: Oct. 29, 1996

[54] AUTOMATIC BREADMAKER WITH INTERIOR LAMP

[75] Inventors: David C. Belongia, West Bend; Annette T. Kruepke, Jackson, both of Wis.

[73] Assignee: The West Bend Company, West Bend, Wis.

[21] Appl. No.: 463,721

[22] Filed: Jun. 5, 1995

[51] Int. Cl.[6] ............................................. A47J 27/00
[52] U.S. Cl. ............................ 99/341; 99/348; 99/467
[58] Field of Search ........................... 99/348, 341, 467, 99/468, 474, 476

[56] References Cited

U.S. PATENT DOCUMENTS

| | | | |
|---|---|---|---|
| 4,294,166 | 10/1981 | Takeuchi | 99/348 |
| 4,415,799 | 11/1983 | Tanaka et al. | 219/400 |
| 4,561,348 | 12/1985 | Halters et al. | 99/341 X |
| 4,776,265 | 10/1988 | Ojima | 99/348 |
| 4,984,512 | 1/1991 | Takahashi et al. | 99/327 |
| 5,410,949 | 5/1995 | Yung | 99/348 X |

Primary Examiner—David Scherbel
Assistant Examiner—Reginald L. Alexander
Attorney, Agent, or Firm—Jansson & Shupe, Ltd.

[57] ABSTRACT

Disclosed is an automatic breadmaker of the type having an oven chamber for baking bread. The chamber is formed by a floor and wall members, including top, front, rear and side wall members. The breadmaker also has a pan in the oven chamber for containing a bread product. The improvement comprises a lamp secured to the top wall member, whereby light is directed downwardly to illuminate the bread product during baking. Preferably, the lamp is over the pan and the breadmaker includes a barrier interposed between the lamp and the region from which a user views the contents of the pan. Unreflected light from the lamp is thereby substantially prevented from entering the viewing region and impairing the user's view of the bread product.

8 Claims, 6 Drawing Sheets

AUTOMATIC BREADMAKER WITH INTERIOR LAMP

FIELD OF THE INVENTION

This invention is related generally to food apparatus and, more particularly, to baking apparatus.

BACKGROUND OF THE INVENTION

Automatic breadmakers for home use are becoming increasingly popular, in large part because the user is able to prepare specialty and custom loaves of bread of a type not available or not readily available at most retail stores. Another reason for the popularity of such breadmakers is that bread can be consumed when warm, i.e., immediately after baking. Warm, freshly-baked bread has a unique aroma and texture that adds to dining pleasure.

There are a number of examples of automatic breadmakers in the patent literature. U.S. Pat. Nos. 4,294,166 (Takeuchi); 4,415,799 (Tanaka et al.); 4,776,265 (Ojima) and 4,984,512 (Takahashi et al.) represent but a few. Of the breadmakers shown in such patents, those of the Ojima and Takahashi et al. patents are top-loaded while those of the Takeuchi and Tanaka et al. patents are front-loaded.

Home users often insist upon a breadmaker which is sufficiently low to fit on a countertop beneath above-counter cupboards. And the majority of such users prefer a breadmaker which loads and unloads through the top rather than through a generally upright front opening.

To meet the demand for a relatively low breadmaker which is also top-loading, manufacturers have configured breadmakers with pivoting top doors hinged along the rear edge. The breadmaker shown in the Ojima patent is a good example of a breadmaker of that type. And to further accommodate customer preferences, pivoting top doors have been made to be entirely removable from the breadmaker.

Automatic breadmakers currently being sold in the United States include no provision for illuminating the product contained in the bread pan. And the patent literature generally is not to the contrary. At least, the Takeuchi, Ojima and Takahashi et al. patents do not show a lamp of any type.

This is not surprising—Underwriters Laboratories imposes extremely stringent requirements with respect to lamps powered by flexing conductors. And if a lamp is separable from its conductors, some sort of plug-and-socket arrangement is dictated. The Tanaka et al. patent shows what appears to be a lamp which is placed to one side of the breadmaker behind grill work. The grill work obstructs the path of light rays emanating from such lamp but even if unobstructed, the location of such lamp is wholly inadequate to illuminate the top of a loaf of bread.

An improved automatic breadmaker having a lamp which illuminates the chamber interior "top-down" and which is powered by conventional appliance wiring would be an important advance in the art.

OBJECTS OF THE INVENTION

It is an object of the invention to provide an automatic breadmaker overcoming some of the problems and shortcomings of the prior art.

Another object of the invention is to provide an automatic breadmaker which provides "top-down" illumination of the breadmaker contents.

Another object of the invention is to provide an automatic breadmaker configured without regard to special wiring considerations.

Yet another object of the invention is to provide an automatic breadmaker having an interior lamp powered by conventional non-flexing wiring.

Another object of the invention is to provide an automatic breadmaker having a permanently-wired lamp for top-down illumination of the bread product.

Another object of the invention is to provide an automatic breadmaker which fully illuminates the top surface of the bread product.

Still another object of the invention is to provide an automatic breadmaker which substantially prevents unreflected light from the interior lamp from impairing the ability of the user to clearly see the bread product in the pan. How these and other objects are accomplished will become apparent from the following descriptions and from the drawings.

SUMMARY OF THE INVENTION

The invention is an automatic breadmaker of the type having an oven chamber for baking bread. Such chamber is formed by floor and wall members, the latter including top, front, rear and side wall members. The breadmaker has a pan in the oven chamber for containing a bread product.

The improvement comprises a lamp secured to the top wall member, i.e., positioned so that light is directed downwardly to illuminate the bread product during baking. Such downwardly-directly light includes light directed substantially vertically and, preferably, also includes non-vertical light on either side of the vertically-directed light. In a highly preferred embodiment, the lamp is over the pan.

The new breadmaker also has a non-vertical viewing window secured with respect to the wall members at a position above the pan. A user views the bread product from a viewing region through the window and the breadmaker preferably includes a barrier interposed between the lamp and the viewing region. Unreflected light from the lamp is substantially prevented by the barrier from entering the viewing region. And because the lamp remains stationary as the breadmaker door is opened, there are no special wiring considerations as might otherwise be imposed.

Further details of the invention are set forth in the following detailed description and in the drawing.

DETAILED DESCRIPTION OF PREFERRED EMBODIMENTS

Figure 1:
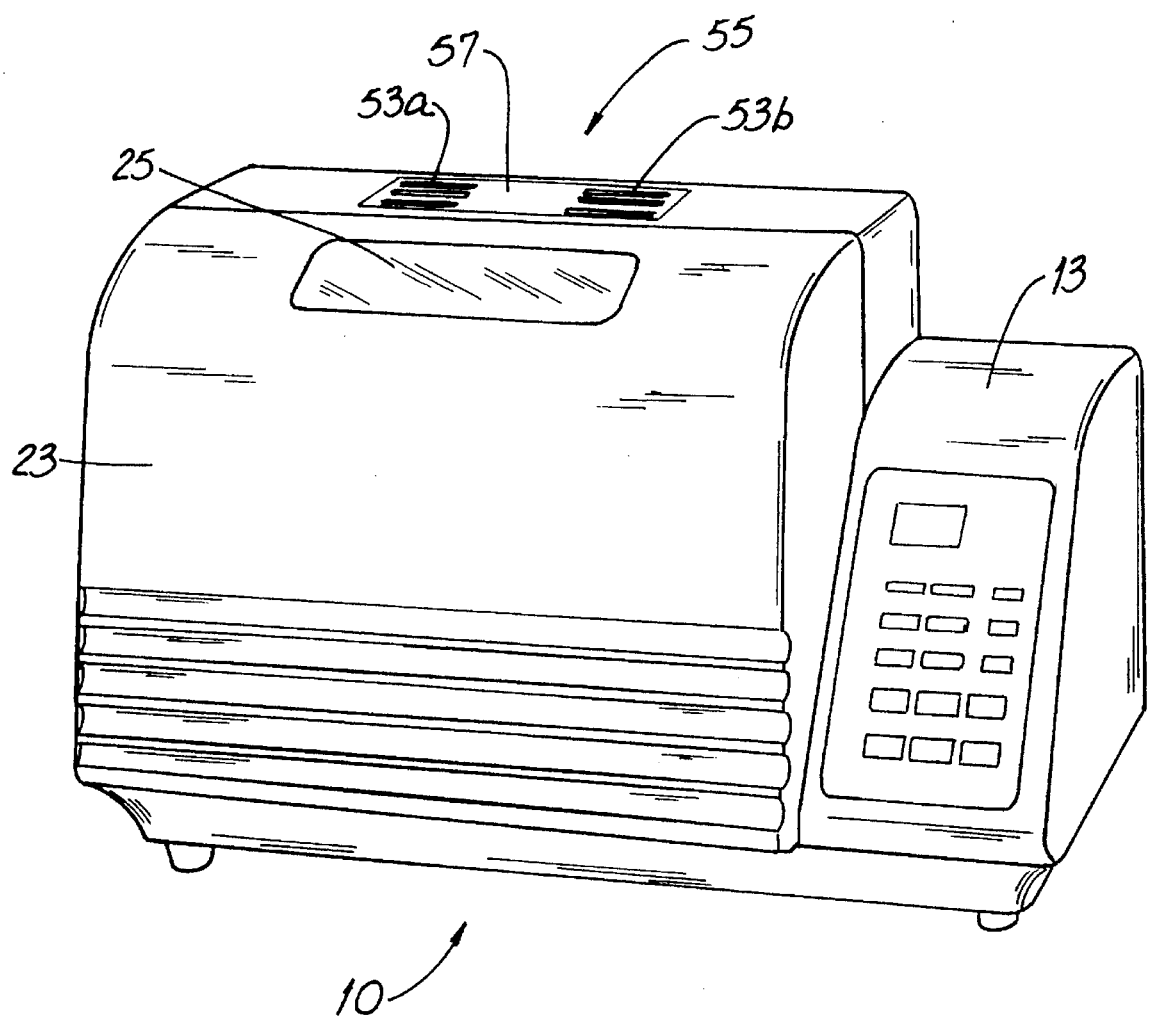
FIG. 1 is a front perspective view of the new breadmaker.
Figure 2:
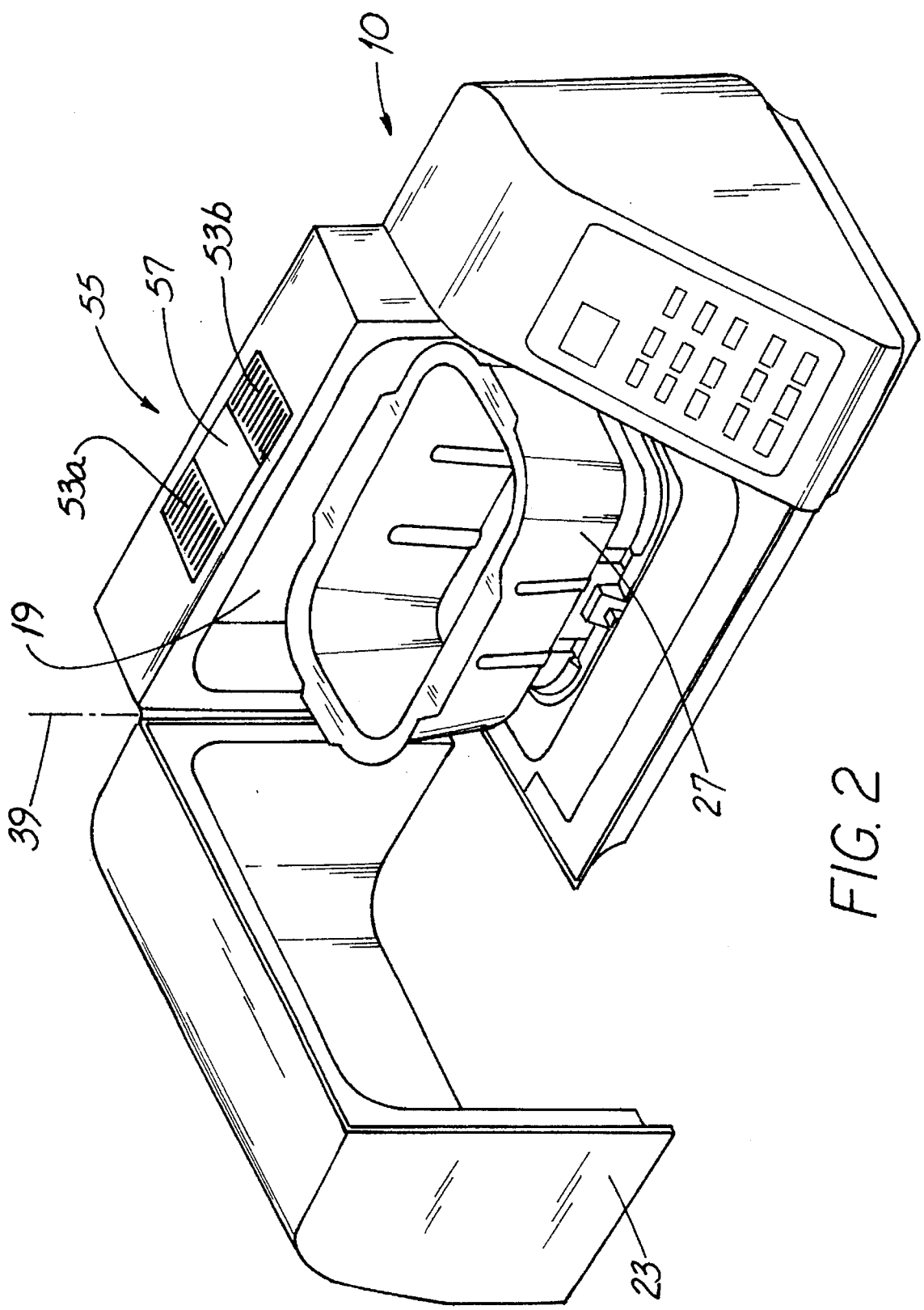
FIG. 2 is a perspective view of the breadmaker of FIG. 1 with the door open.
Figure 3:
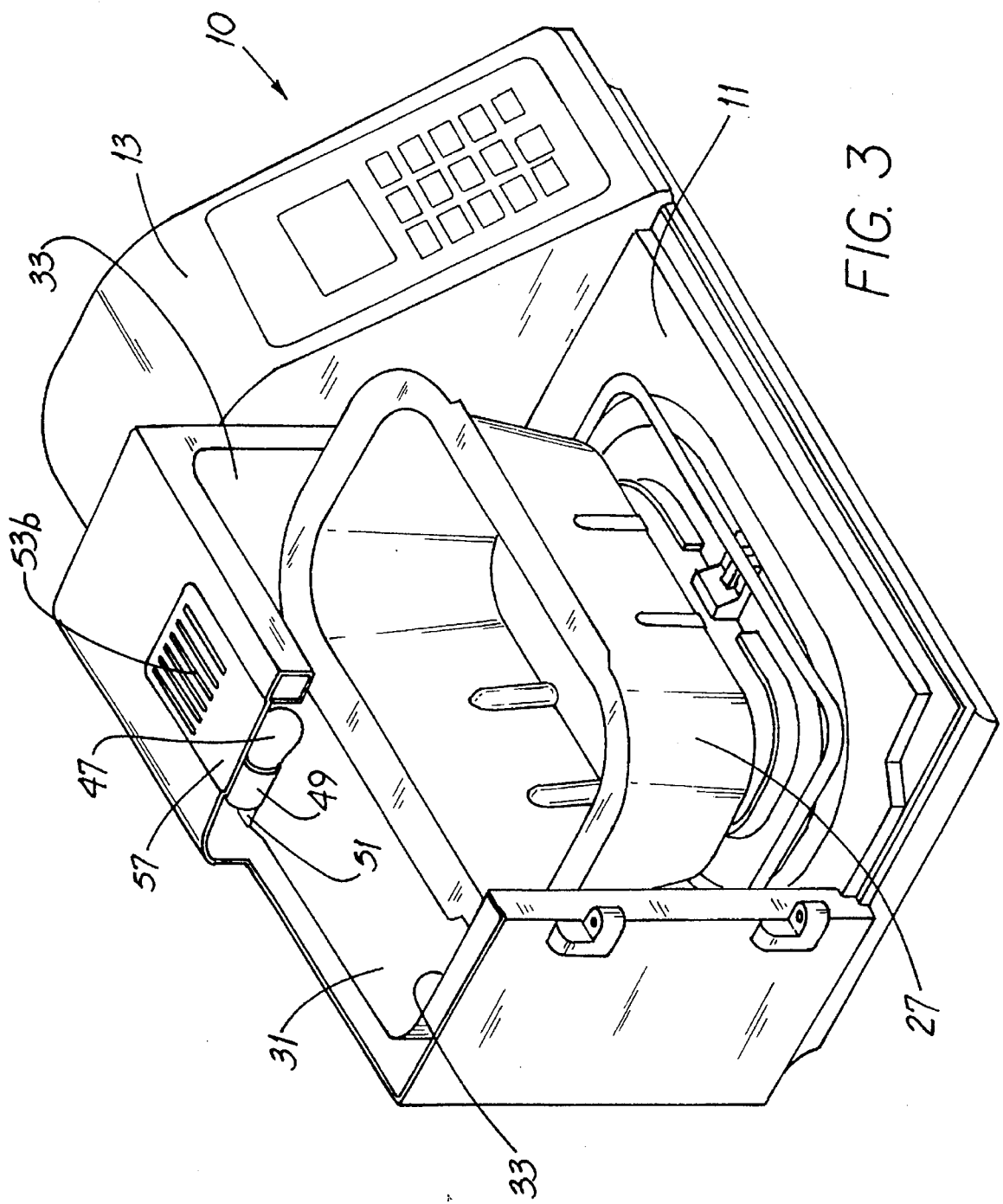
FIG. 3 is a perspective view of the breadmaker of FIG. 1 with the door omitted and with parts shown in cross-section.

A few definitions will be helpful in appreciating the invention. In this specification, the term "length" means a dimension measured generally left-right as viewed in FIGS. 1, 2, 3 and 4. The term "bread product" means (a) ingredients for making a loaf a bread, (b) baking bread, and (c) baked bread.

Referring to the FIGURES, the new automatic breadmaker 10 has a floor 11 and a compartment 13 atop the floor. Such compartment 13 encloses a controller and drive motor (not shown).

An oven chamber 19 abuts the compartment 13 and is formed in part by the floor 11 and by the top, rear and side wall members 29, 31 and 33 respectively. The breadmaker 10 has a laterally-swinging access door 23 with a window 25 allowing the user to view kneading and baking operations from a viewing region 35. A pan 27 is mounted in the chamber 19 to contain a bread product 37.

In a highly preferred embodiment, the access door 23 is hinged to pivot laterally about a substantially vertical axis 39 and in a substantially horizontal direction. When the access door 23 is closed, it extends upwardly from along the oven floor 11 and curves rearwardly to a position directly over the pan 27. When the door 23 is open, the breadmaker 10 has a very generous mouth area, open at the top as well as at the front and sides, so that insertion and removal of the pan 27 is very easy.

Figure 4:
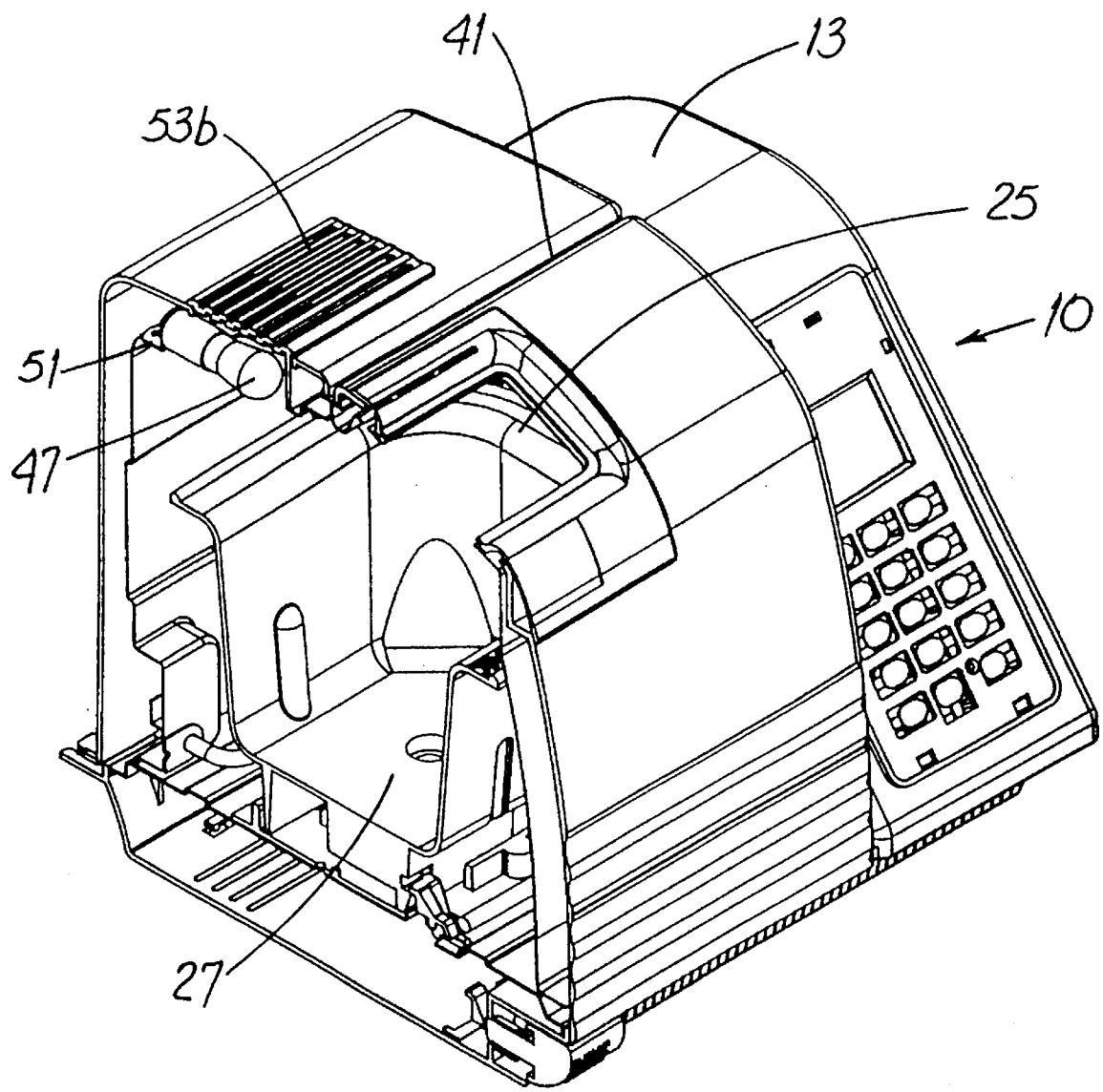
FIG. 4 is a sectional perspective view of the breadmaker of FIG. 1 taken along a generally vertical front-to-rear plane extending through the breadmaker lamp. Such lamp is shown in full representation.
Figure 5:
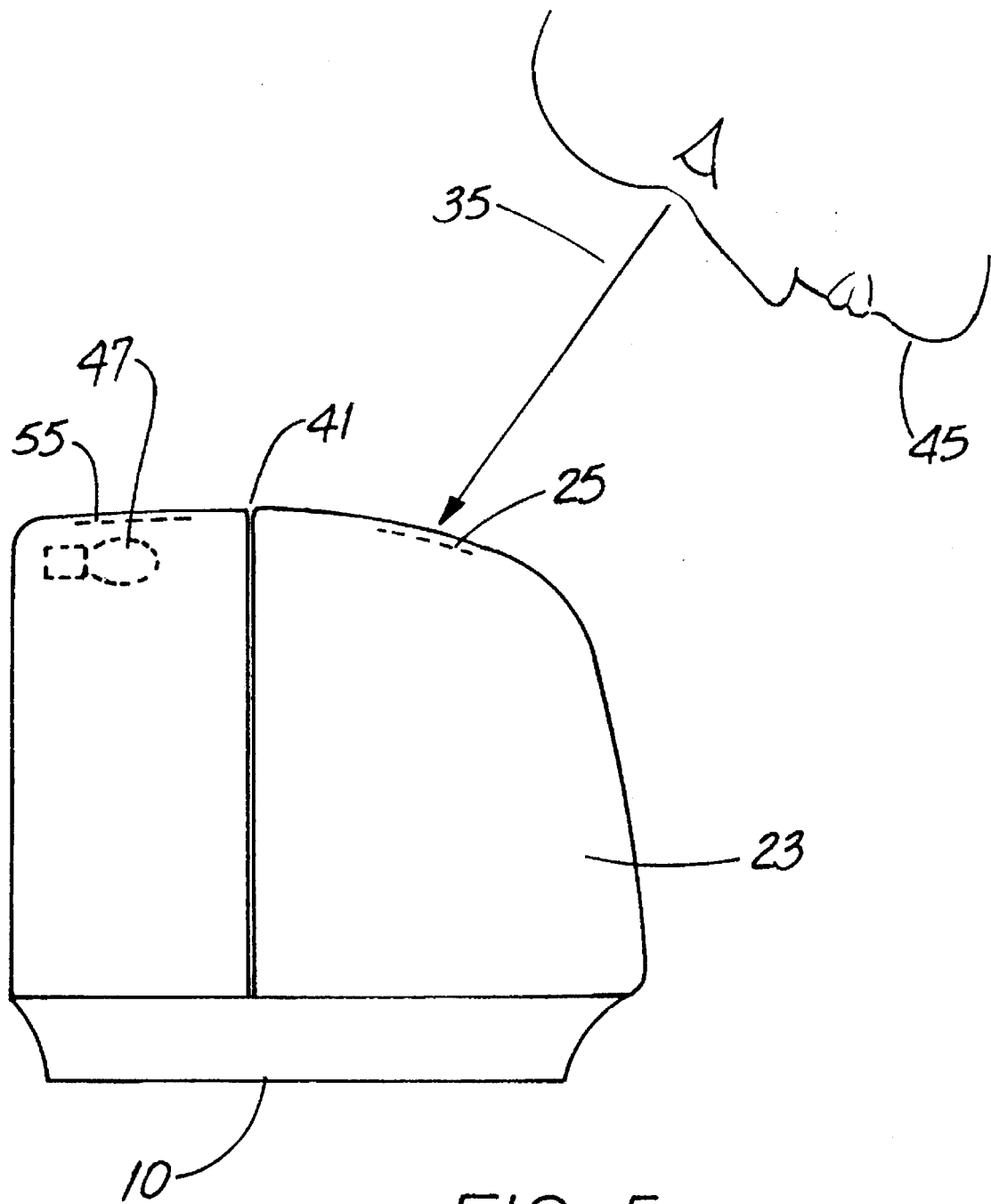
FIG. 5 is a representative side elevation view of the breadmaker of FIG. 1. Parts are represented by dashed outline.
Figure 6:
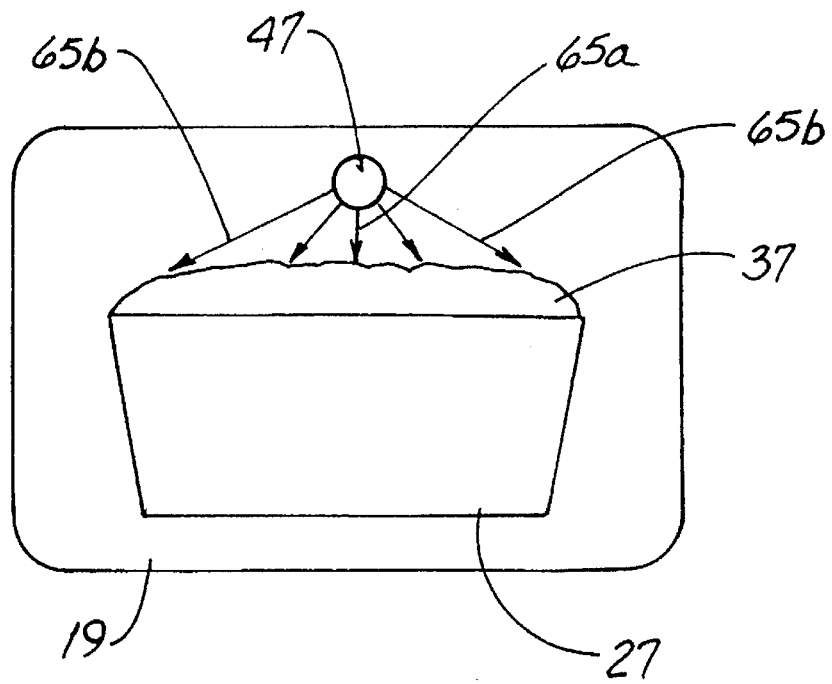
FIG. 6 is a representative front elevation view of the interior chamber of the breadmaker of FIG. 1 showing the lamp illuminating a bread product contained in a bread pan.
Figure 7:
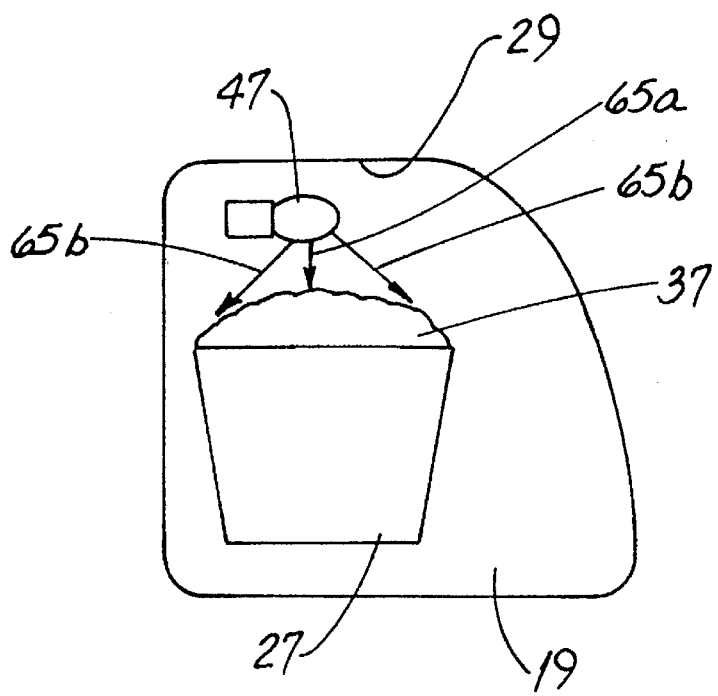
FIG. 7 is a representative side elevation view of the interior chamber of the breadmaker of FIG. 1 showing the lamp illuminating a bread product contained in a bread pan.

Referring particularly to FIGS. 4 and 5, the non-vertical (i.e., angled) viewing window 25 is secured with respect to the wall members 29, 31, 33 at a position above the pan 27. A user 45 views the bread product 37 from the viewing region 35 by looking through the window 25.

Referring particularly to FIGS. 3, 4, 5, 6 and 7, the interior lamp 47 is received in a socket 49, the mounting bracket 51 for which is secured generally at the junction of the top and rear wall members 29 and 31, respectively. Such lamp 47 is positioned laterally (left-right in the view of FIG. 1) between two sets of ventilating slots 53a, 53b in a louver 55. Such sets of slots 53a, 55a vent the chamber 19 to atmosphere.

The louver 55 includes an imperforate light barrier 57 interposed between the lamp 47 and the viewing region 35. In the exemplary embodiment, the barrier 57 is provided by causing those portions of the slots at the central region of the louver 55 to be filled with opaque material, e.g., the plastic from which the louver 55 is molded. To put it another way, the sets of slots 53a, 53b in the louver 55 do not extend the full length of the louver 55; they are interrupted by the barrier 57.

As shown in FIGS. 3, 4, 6 and 7, the lamp 47 is positioned over the pan 27 so that light is directed downwardly to illuminate the bread product 37 during baking. Rays of light are represented by the arrows 65. Such downwardly-directly light 65 includes light 65 directed substantially vertically (as represented by the arrow 65a) and, preferably, also includes non-vertical light 65 on either side of the vertically-directed light. Such non-vertical light 65 is represented by the arrows 65b.

While the principles of the invention have been described in connection with specific embodiments, it is to be understood clearly that such embodiments are exemplary and not limiting.

We claim:

1. In an automatic breadmaker of the type having an oven chamber for baking bread, the chamber formed by a door, a floor and wall members, including top, front, rear and side wall members, and a pan in the oven chamber for containing a bread product, the improvement wherein:

the door is mounted for movement with respect to the top wall member; and a lamp is secured away from the door and in a fixed position with respect to the rear wall member, whereby light is directed downwardly to illuminate the bread product during baking.

2. The automatic breadmaker of claim 1 wherein the lamp is substantially centered over the pan.

3. The automatic breadmaker of claim 1 further including a viewing window forward of the pan and at an angled position with respect to the floor.

4. The automatic breadmaker of claim 3 wherein the lamp is substantially centered over the pan.

5. The automatic breadmaker of claim 3 wherein:

a user views the bread product from a viewing region and at an angle with respect to the pan; and the breadmaker includes a light barrier interposed between the lamp and the viewing region and fixed with respect to the floor, whereby unreflected light from the lamp is substantially prevented from entering the viewing region.

6. In an automatic breadmaker of the type having an oven chamber for baking bread and a pan in the chamber for containing a bread product, the improvement comprising a lamp over the pan, such lamp being fixed with respect to the chamber, being mounted above the and centered laterally with respect to such pan, thereby directing light downwardly onto the bread product.

7. The automatic breadmaker of claim 6 further including a viewing window forward of the lamp.

8. The breadmaker of claim 6 further including a door and wherein the lamp is stationary when the door moves.

\* \* \* \* \*